United States Patent [19]

Tsakumis

[11] 4,397,980

[45] Aug. 9, 1983

[54] PROCESS FOR PREPARING PTFE POWDERED RESINS CONTAINING PIGMENTS EMPLOYING AMMONIUM CARBONATE OR AMMONIUM BICARBONATE

[75] Inventor: Theodore G. Tsakumis, Washington, W. Va.

[73] Assignee: E. I. Du Pont de Nemours and Company, Wilmington, Del.

[21] Appl. No.: 419,545

[22] Filed: Sep. 17, 1982

[51] Int. Cl.$^3$ ............................................. C08K 3/26
[52] U.S. Cl. .................................. 524/424; 523/200; 524/427; 524/546
[58] Field of Search ............... 524/424, 427, 546; 523/200

[56] References Cited

U.S. PATENT DOCUMENTS

| | | | |
|---|---|---|---|
| 2,478,229 | 8/1949 | Berry | 260/29.6 |
| 2,891,921 | 6/1959 | Kumnick et al. | 260/29.6 |
| 3,037,953 | 6/1962 | Marks et al. | 260/29.6 |
| 3,585,263 | 6/1971 | Rassart | 264/176 F |
| 3,766,133 | 10/1973 | Roberts et al. | 524/546 |
| 3,772,249 | 11/1973 | Morgans | 524/546 |
| 3,772,249 | 11/1973 | Morgans | 260/41 |
| 3,793,287 | 2/1974 | Fitz et al. | 260/41 |
| 3,929,721 | 12/1975 | Leverett | 524/546 |
| 4,038,244 | 7/1977 | Ogden et al. | 260/42.16 |
| 4,153,661 | 5/1979 | Ree et al. | 264/175 |
| 4,232,126 | 11/1980 | Marquisee | 521/65 |
| 4,368,296 | 1/1983 | Kuhls et al. | 524/546 |
| 4,370,436 | 1/1983 | Nakamura et al. | 524/546 |

FOREIGN PATENT DOCUMENTS 1250798 10/1971 United Kingdom .

OTHER PUBLICATIONS

Chem. Abs. 85-34021c, Peter et al., (1975).
Chem. Abst. 78-59328b, (1973), Hladik.
Chem. Abs. 73-67064z, (1970), Esker.

*Primary Examiner*—Melvyn I. Marquis
*Assistant Examiner*—Herbert J. Lilling

[57] ABSTRACT

Process for uniformly incorporating pigment into fine powder TFE polymers by premixing pigment and ammonium carbonate or bicarbonate, and then adding the mixture to a TFE polymer aqueous dispersion, followed by coagulating the pigment and TFE polymer.

4 Claims, No Drawings

PROCESS FOR PREPARING PTFE POWDERED RESINS CONTAINING PIGMENTS EMPLOYING AMMONIUM CARBONATE OR AMMONIUM BICARBONATE

BACKGROUND OF THE INVENTION

Pigments are commonly added to tetrafluoroethylene (TFE) polymer resins to create color in articles made of the resins. Heretofore, pigments have been added by dry mixing the pigment directly into the resin; however, due to tendency of the pigment particles to adhere to one another, it is difficult to obtain uniformly dispersed particles. It has also been known heretofore to add pigment directly to aqueous dispersions of non-melt-processible TFE polymer especially when the polymer has been produced by the aqueous dispersion polymerization process. Upon coagulation of the polymer and the pigment particles, the pigment becomes mixed with the coagulated polymer. Unfortunately, pigments are generally hydrophobic and tend to clump during the agitation that is needed to coagulate the polymer, thus resulting in poorly dispersed pigment.

The precipitated polymer produced by the aqueous dispersion polymerization process is referred to in the TFE polymer field as "fine powder" resin and will be so referred to herein.

SUMMARY OF THE INVENTION

In this invention, pigment particles are uniformly dispersed in the fine powder TFE polymer resin by first mixing the pigment particles with ammonium carbonate or bicarbonate (both are solid particles), then adding the mixture to the aqueous dispersion of TFE polymer before the coagulating step is carried out. The premixing of the pigment with the carbonate or bicarbonate effectively prevents clumping of the pigment during coagulation.

Specifically, this invention is a process for preparing tetrafluoroethylene polymer resins having pigment dispersed therein, which comprises (a) mixing a pigment with ammonium carbonate or ammonium bicarbonate or both in a proportion of at least 40% by weight carbonate or bicarbonate, then (b) adding the mixture to an aqueous dispersion containing 10-30% by weight of a non-melt-processible TFE polymer, (c) coagulating the TFE polymer and pigment, (d) collecting the resulting pigmented TFE polymer that was coagulated in step (c).

DESCRIPTION

The process for polymerizing TFE monomer, e.g., tetrafluoroethylene, to make TFE polymers by the aqueous dispersion method is well known. The TFE polymer in the dispersion will usually be present in an amount of 10-30 percent by weight.

The TFE polymer is preferably one made entirely of polytetrafluoroethylene (PTFE hereinafter). However, it can be a copolymer of tetrafluoroethylene (TFE) and other fluoromonomers that are present in small amounts which do not alter the non-melt-processibility characteristic of the predominately PTFE polymer. Such "other fluoromonomers" include perfluoro(alkyl vinyl) monomers of the formula $R_f-CF=CF_2$ where $R_f$ is perfluorinated alkyl of of 1-6 carbons; perfluoro(alkyl vinyl ethers) of the formula $R_f-O-CF=CF_2$; and perfluoroalkyl ethylenes of the formula $R_f-CH=CH_2$.

The pigment can be any pigment ordinarily used to add color to TFE polymers. A number of such pigments are mentioned in the examples.

The pigment particles are mixed prior to adding them to the aqueous dispersion with ammonium carbonate or bicarbonate by any commonly used dry blending technique, such as tumbling, bag blending, or blending in a mechanical mixer such as a Rietz mill or Hansel mixer. The mixture will usually contain at least 40% carbonate or bicarbonate, preferably 50%, and most preferably 50-85% by weight of the carbonate or bicarbonate and complementally 50-15% pigment.

The mixture is then added to the aqueous TFE polymer dispersion, which usually contains 10-30% TFE polymer by weight (commonly called "solids content"); while gently stirring the dispersion. The amount of the mixture added will ordinarily be between about 1 and 5 percent by weight based on TFE polymer. Upon adding the mixture, the TFE polymer dispersion thickens, and it is conjectured that it is this thickening that prevents the pigment from clumping.

When the mixture is added, the resulting TFE polymer dispersion is agitated, usually by stirring, at a level of agitation sufficient to induce coagulation of the TFE polymer. Addition of mixture and coagulation may occur in sequence or simultaneously. The coagulated fine powder is then collected and dried by any convenient means.

The fine powder so obtained is observed to have the pigment particles uniformly distributed throughout the powder. Addition of mixture and coagulation may occur in sequence of simultaneously. The powder so obtained can be used to make cable and wire coatings by the usual paste extrusion process.

EXAMPLES

The TFE polymer dispersion used in the following Examples was an aqueous dispersion of PTFE (homopolymer) present in an amount of about 18% by weight in the dispersion. This weight percent is usually called "solids content" of the dispersion. The dispersion employed was "as made" by the aqueous dispersion polymerization process and thus contained about 0.221 weight percent of ammonium fluorooctanoate dispersing agent. To effect pigment addition and coagulation, the dispersion was placed in a 7 gallon (26 l) vessel fitted with half baffles and two impellers.

All percents are by weight unless otherwise stated.

EXAMPLE 1

A 50/50 weight percent mixture of ammonium bicarbonate and a yellow pigment (Krolar 4-787-D) was prepared by blending in a Rietz mill and passing the mixture through a mesh screen with 0.016 inch (0.006 cm) holes.

37.2 gm (1.03% based on weight of PTFE) of the mixture was added to 18 liters of PTFE dispersion of the 18% solids concentration prepared by the aqueous dispersion procedure. The temperature of the dispersion was 23° C. and the dispersion was agitated at 200 rpm for 90 seconds and then the agitation was increased to 400 rpm for 8.5 minutes. Upon coagulation, the resulting pigmented fine powder PTFE was collected and dried. Results are described below.

COMPARISON WITH EXAMPLE 1

37.2 g of the same yellow pigment was added to the same PTFE dispersion without premixing it with the bicarbonate, and the dispersion agitated for 15 minutes at 310 rpm and 20° C. The resulting pigmented fine powder was collected and dried. Results are described below.

EXAMPLE 2

Example 1 was repeated using red pigment Monastral RT-759-D instead of the yellow pigment. The dispersion was agitated for five minutes at 200 rpm and then at 360 rpm for ten more minutes. The pigmented fine powder was collected and dried. Results are described below.

EXAMPLE 3

A 50/50 percent mixture of graphite and ammonium bicarbonate was prepared as in Ex. 1. 37.2 g (1.03% based on weight of PTFE) of the mixture was added to 18 l of the PTFE dispersion at 22° C. The dispersion was agitated at 150 rpm for 2 minutes and then for 10 minutes at 360 rpm. The pigmented fine powder PTFE was collected and dried. Results are described below.

EXAMPLE 4

18.6 g of a white $TiO_2$ pigment was blended, as in Example 1, with 111 g ammonium bicarbonate to make a 14.3/85.7 percent mixture. The mixture (3.09% based on weight of PTFE) was added to the PTFE dispersion as in Ex. 1 and agitated at 200 rpm for 3 minutes, then at 356 rpm for 10 minutes. The coagulated pigmented PTFE was collected and dried.

EXAMPLE 5

A 50/50 percent mixture of graphite and ammonium carbonate was prepared as in Ex. 1. 149.6 g of the mixture (4.16% based on weight of PTFE) was added to 18 l of the 18% solids PTFE dispersion and agitated for 5 minutes at 200 rpm. Then the agitation was increased to 350 rpm for an 10 minutes. Temperature was 23° C. The pigmented fine powder was collected and dried.

EXAMPLE 6

80 g of a red Monastral BT-759-D was blended with 160 g ammonium bicarbonate in a bottle by rolling it for 15 minutes and the mixture was subjected to a Rietz mill and then passed through a screen with 0.008 inch (0.02 cm) holes. 114.6 g of the the mixture (3.19% based on weight of PTFE) was added to 18 l of the 18% PTFE dispersion and the dispersion agitated at 330 rpm for 2 minutes at 21° C. The pigmented fine powder was collected and dried.

EXAMPLE 7

80 g of a blue Monastral BT-449-D was mixed with 240 g ammonium bicarbonate as in Ex. 6, except the screen has 0.012 inch (0.03 cm) holes. 118.8 g of the mixture (3.3% based on weight of PTFE) was mixed with 18 l of the 18% solids PTFE dispersion and agitated for 10 minutes at 320 rpm at 21° C. The pigmented fine powder was collected and dried.

COMPARISON WITH EXAMPLE 7

37.2 g of the same blue Monastral BT-449-D was (1.03% based on weight of PTFE) added to 18 l of the same PTFE dispersion without premixing the bicarbonate, and agitated for 10 minutes at 330 rpm at 21° C. The resulting pigmented fine powder was collected and dried.

Results

All the pigmented fine powders of the foregoing examples and comparisons were dried at 150° C. for 16 hours and then screened through a #7 mesh (0.280 cm) vibrating screen to remove oversize particles. Samples were then molded and sintered at 380° C. temperature and 10,000 psi pressure, and formed into 5 mil thick films. When the films were viewed at 56× through a microscope, the pigment was observed to be uniformly dispersed throughout the resins prepared by the process of this invention, and no large pigment clumps were observed. However, in the films of the comparisons, large pigment clumps were observed and the pigment particles were not uniformly dispersed.

In addition, tapes were prepared from the fine powders by pressing powder (80 g) at room temperature (about 24° C.) at 10,000 psi and then heating the sample at 250° C. and increasing the temperature to 371° C. at a rate of 2° C. per minute. The sample is then held at 271° C. for 90 minutes, then it is cooled to 250° C. at a rate of 1° C. per minute and held at 250° C. for thirty minutes before cooling to room temperature. It was observed visually that in the tapes of the comparisons, holes were present that were caused by weakness due to the presence of clumps of pigment. No such holes were observed in tapes made of powders prepared by the process of this invention.

I claim:
1. Process for preparing tetrafluoroethylene (TFE) polymer resins having pigment dispersed therein, which comprises
   a. mixing a pigment with ammonium carbonate or ammonium bicarbonate or both in a proportion of at least 40% by weight carbonate or bicarbonate,
   b. adding the mixture to an aqueous dispersion containing 10–30% by weight of a non-melt-processible TFE polymer,
   c. coagulating the TFE polymer and pigment,
   d. collecting the resulting pigmented TFE polymer that was coagulated in step (c).
2. The process of claim 1 wherein, in step 1, the pigment and the carbonate or bicarbonate or both are mixed in proportion of 50–85% by weight carbonate or bicarbonate and complementally 50-15% by weight pigment.
3. The process of claim 1 or 2, wherein the TFE polymer is TFE homopolymer.
4. The process of claim 1 or 2 wherein in step (b), the amount of the mixture added is between 1 and 5 percent by weight based on TFE polymer.

* * * * *